US006996028B2

(12) United States Patent
Bernth et al.

(10) Patent No.: US 6,996,028 B2
(45) Date of Patent: Feb. 7, 2006

(54) VELOCITY ANALYSIS ON SEISMIC DATA

(75) Inventors: Henrik Bernth, London (GB);
Francois Daube, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 281 days.

(21) Appl. No.: 10/416,245

(22) PCT Filed: Nov. 9, 2001

(86) PCT No.: PCT/GB01/04977

§ 371 (c)(1),
(2), (4) Date: May 8, 2003

(87) PCT Pub. No.: WO02/39144

PCT Pub. Date: May 16, 2002

(65) Prior Publication Data

US 2004/0022126 A1    Feb. 5, 2004

(30) Foreign Application Priority Data

Nov. 9, 2000    (GB)    .................................... 0027372

(51) Int. Cl.
*G01V 1/34*    (2006.01)
*G01V 1/28*    (2006.01)
(52) U.S. Cl. ........................... 367/72; 367/38; 367/52; 367/73; 702/14; 702/18
(58) Field of Classification Search ................ 367/38, 367/52, 72, 73; 702/14, 18
See application file for complete search history.

(56) References Cited

U.S. PATENT DOCUMENTS

| 4,479,205 | A | * | 10/1984 | Gray | ........................... 367/63 |
|---|---|---|---|---|---|
| 4,813,027 | A | | 3/1989 | Tieman | ........................ 367/52 |
| 4,849,887 | A | * | 7/1989 | Skylas | .......................... 702/18 |
| 4,984,220 | A | * | 1/1991 | Bodine et al. | ................. 367/68 |
| 5,058,079 | A | * | 10/1991 | Wright et al. | ................. 367/59 |
| 5,394,325 | A | * | 2/1995 | Schneider, Jr. | ............... 702/18 |
| 5,513,150 | A | * | 4/1996 | Sicking et al. | ................ 367/73 |
| 5,629,904 | A | * | 5/1997 | Kosloff et al. | ................ 367/53 |
| 5,657,223 | A | * | 8/1997 | Juszczak et al. | ............ 705/400 |
| 5,978,314 | A | * | 11/1999 | Pham | ........................... 367/52 |
| 5,995,904 | A | * | 11/1999 | Willen et al. | .................. 702/14 |
| 6,049,509 | A | * | 4/2000 | Sonneland et al. | ........... 367/49 |
| 6,049,759 | A | * | 4/2000 | Etgen | ........................... 702/14 |
| 6,128,580 | A | * | 10/2000 | Thomsen | ...................... 702/18 |
| 6,493,634 | B1 | * | 12/2002 | Krebs et al. | ................... 702/14 |

OTHER PUBLICATIONS

PCT International Search Report, PCT/GB 01/04977, dated Feb. 25, 2002.
Yilmaz, O., "Seismic Data Processing" 1987, Society of Exploration Geophysicists, Tulsa XP002189280, p. 166-173; Fig. 3.29.
Ikelle, L.T., "Migration-Velocity Analysis for T1 and Orthorhombic Background Media" Revue De L'Institut Francais Du Petrole, Editions Technip. Paris, Fr. vol. 53, No. 5 No Spec, Sep. 1998, pp. 571-485, XP000831984, ISSN: 1294-4473, Figs. 1-3.

* cited by examiner

*Primary Examiner*—Jack Keith
*Assistant Examiner*—Scott A. Hughes
(74) *Attorney, Agent, or Firm*—WesternGeco, L.L.C.

(57) ABSTRACT

A number of seismic stacks are precomputed (20) for known velocity fields. The velocity fields are chosen to span the range of velocities of interest. The stacks are then arranged (21) in the 3D memory of a graphics computer (10–14) using time and position as first dimensions and the index of the velocity field as the last dimension. In such 3D space, any velocity field to be used for stacking appears as a surface (S) within a volume. Projecting the seismic stacks onto that surface provides the seismic line stacked for the velocity field of interest.

24 Claims, 6 Drawing Sheets

VELOCITY ANALYSIS ON SEISMIC DATA

BACKGROUND OF THE INVENTION

1. Field of the Invention

The present invention relates to a method of processing seismic data and provides a technique for computing a stacked line by interpolation between known stacks.

2. Description of the Related Art

Seismic data are collected using an array of seismic sources and seismic receivers. The data may be collected on land using, for example, explosive charges as sources and geophones as receivers. Alternatively, the data may be collected at sea using, for example, airguns as sources and hydrophones as receivers. After the raw seismic data have been acquired, the reflected signals (known as traces) received by each of the receivers as a result of the process of actuation of a seismic energy source are processed to form a subsurface image. The processing includes the steps of accounting for the separation (known as offset) between sources and receivers and summing related traces together to increase signal/noise ratio (a process known as stacking).

FIG. 1 of the accompanying drawings schematically illustrates an idealised source and receiver arrangement arranged along a line. First, second and third sources 1, 2 and 3, respectively, cooperate with first, second and third receivers 4, 5 and 6, respectively. The sources and receiver are arranged about a common midpoint (CMP) 7 for the source/receiver pairs 1, 6; 2, 5; 3, 4. Seismic energy produced from the actuation of each of the sources 1, 2 and 3 is reflected from partial reflectors such as 9 and received by each of the receivers 4, 5 and 6. The travel time of the energy from a source to a receiver increases with increasing distance (offset) between the source and the receiver. The travel time is also a function of the depth of the reflectors and of the velocity of propagation of the signal within the subsurface formations.

FIG. 2 of the accompanying drawings illustrates the travel time for the situation shown in FIG. 1, as the offset increases. The round trip travel time with respect to offset for each of the reflectors defines a curve. In this simplified situation, the curve can be accurately defined by:

$$t^2 \text{ (offset)} = \text{(offset)}^2/\text{(velocity)}^2 + t^2 \text{ (zerooffset)}$$

where t is the round trip travel time, offset is the distance between source and receiver and velocity is the speed of propagation of seismic signals within the subsurface formations.

During the processing of the seismic survey data, the traces are assigned to their respective common midpoints such that the geology beneath the line of sources and receivers can be probed at a plurality of positions. A velocity analysis is then performed for each common midpoint and indeed for each reflector 9. This is achieved by specifying a range of hyperbolas, as defined in the above equation, related to a range of velocities and computing the reflection amplitude along all specified hyperbolas. The seismic traces for a plurality of offsets are then converted in accordance with the hyperbolas to equivalent traces having zero offset and the traces are then summed (stacked). The resulting amplitudes at zero offset are examined to determine which hyperbola gives the best result for each of the reflectors of each common midpoint. FIG. 3 of the accompanying drawings shows a typical example of velocity analysis at point i, where the velocity function selected by the user varies between a range of known velocities functions.

Once a velocity function has been analyzed for a common midpoint, the seismic data related to the common midpoint are then corrected to zero offset according to the previous equation and then stacked for that particular common midpoint. The stacked trace has an improved signal-noise ratio compared to the traces recorded at the receivers. That process, repeated at each of the common midpoints of the line, produces a stacked seismic line that gives an indication of the geology of the line. The quality of the stacked line is directly related to the quality of the velocity field used for stacking. Stacking a line is a CPU intensive process that necessitates the use of large and powerful machines, especially if it is to be done in real time.

SUMMARY OF THE INVENTION

According to a first aspect of the invention, there is provided a seismic data processing method in which a number of seismic stacks are precomputed for known velocity fields which are chosen to span the range of velocities of interest, and the stacks are then arranged in the 3D memory of a graphics computer, using time and position as first dimensions and the index of the velocity field as the last dimension, to provide a seismic line stacked for a velocity field of interest.

According to a second aspect of the invention, there is provided a method of processing seismic data, comprising the steps of:
 (a) precomputing from the seismic data a plurality of seismic stacks at a plurality of positions and for a plurality of predetermined velocity functions which span a range of velocities of interest;
 (b) arranging the stacks in a memory of a graphics computer as a three dimensional array with time, position and index of velocity function as the three dimensions of the arrays;
 (c) selecting a velocity function within the range of velocities of interest; and
 (d) using a graphics program of the computer to derive from the array of stacks a seismic line representing seismic data stacked for the selected velocity function.

The positions may comprise common midpoints of the seismic data.

At least some of the predetermined velocity functions may be selected arbitrarily. The predetermined velocity functions may comprise a first function and a plurality of second functions, each of which is equal to the product of the first function and a respective coefficient. The coefficients may be substantially evenly spaced.

The array may be a rectangular array.

The step (d) may comprise performing an interpolation. The interpolation may comprise interpolating from a set of values in the stacks surrounding each point of the selected velocity function. The interpolation may be a linear interpolation. The interpolation may be a multi linear interpolation. The interpolation may be a trilinear interpolation.

According to a third aspect of the invention, there is provided a computer programmed to perform a method according to the first or second aspect of the invention.

According to a fourth aspect of the invention, there is provided a program for programming a computer to perform a method according to the first or second aspect of the invention.

According to a fifth aspect of the invention, there is provided a storage medium for containing a program according to the fourth aspect of the invention.

The present invention replaces the method of conventional stacking with a technique based on interpolation that can be performed very quickly on modern graphics computers.

DESCRIPTION OF DRAWINGS

The invention will be further described, by way of example, with reference to the accompanying drawings, in which.

DESCRIPTION OF SPECIFIC EMBODIMENTS

Figure 1:
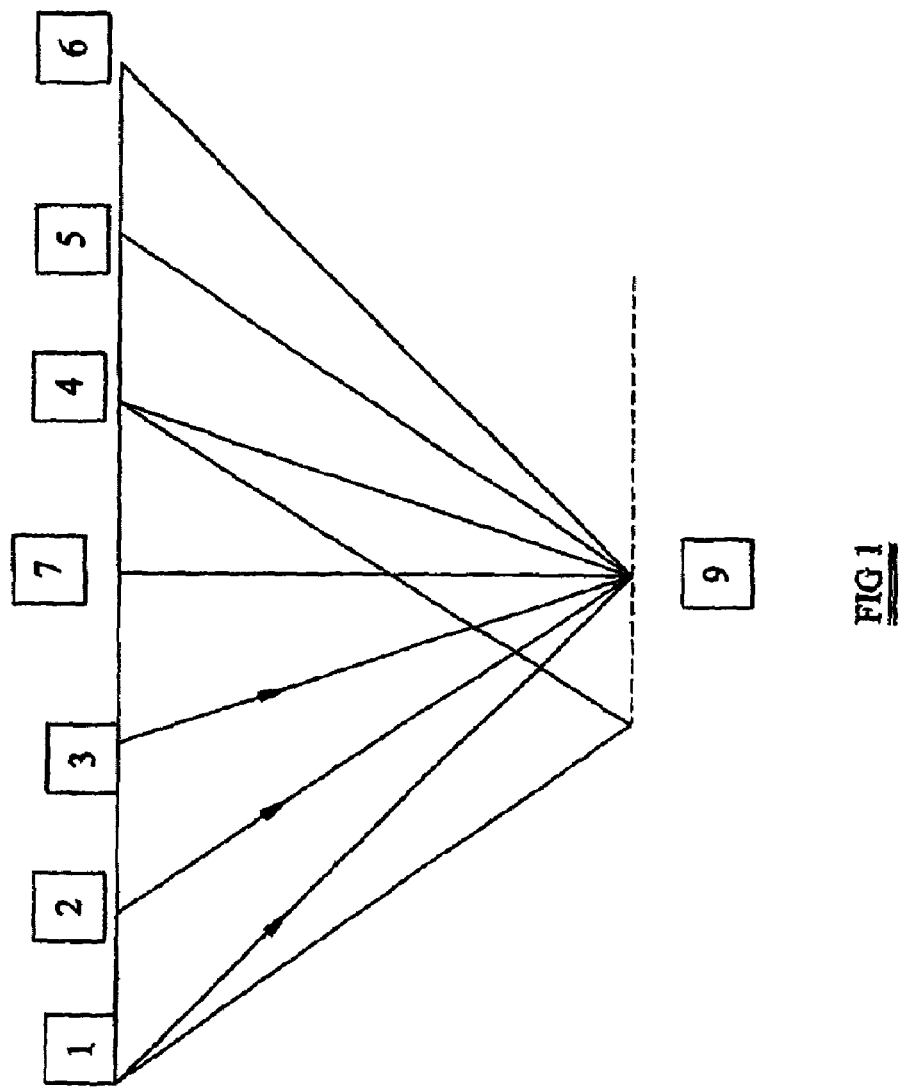
FIG. 1 illustrates diagrammatically a seismic source/receiver arrangement of known type.
Figure 2:
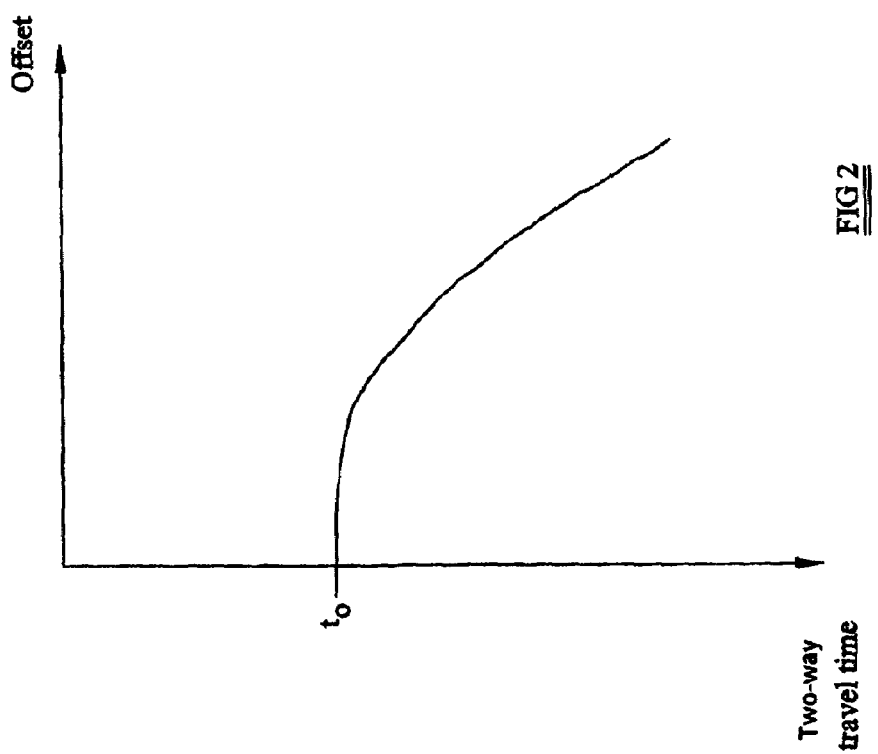
FIG. 2 is a graph illustrating travel time against offset.
Figure 3:
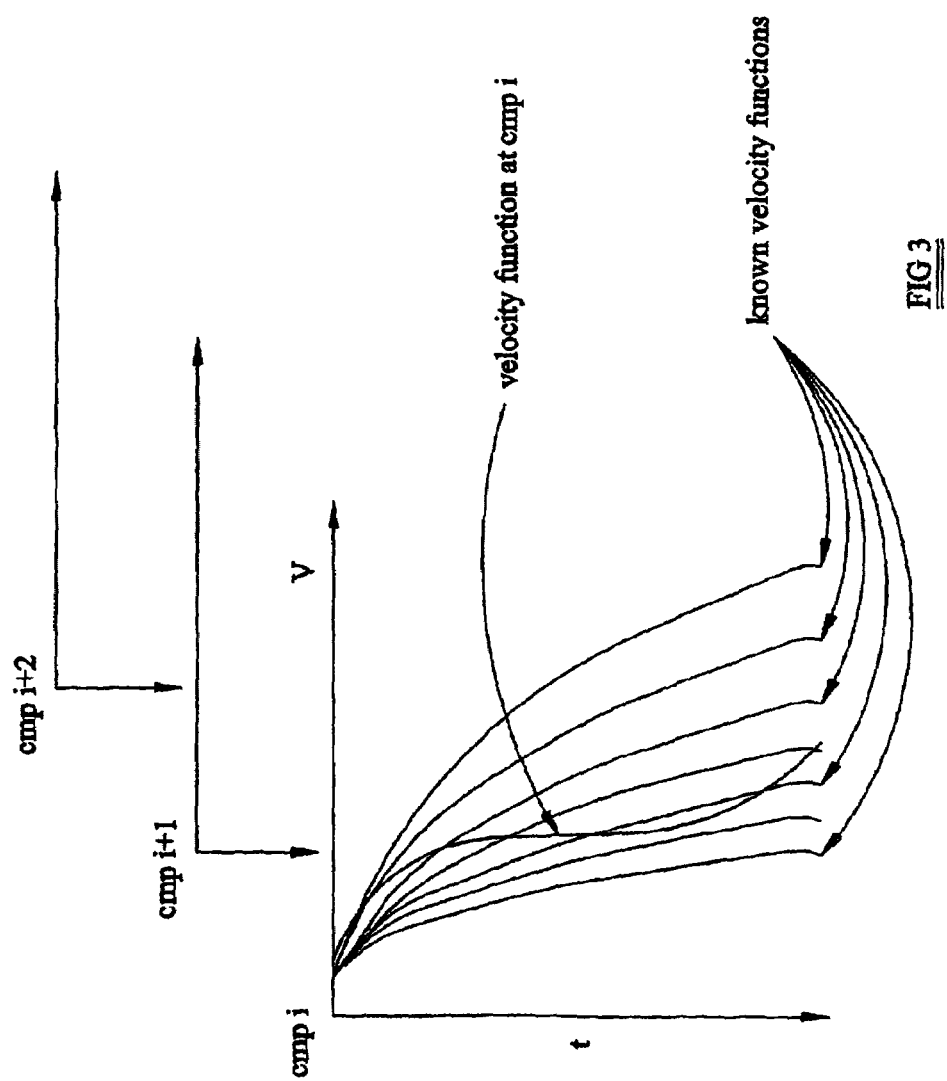
FIG. 3 illustrates various velocity functions as velocity against time.
Figure 4:
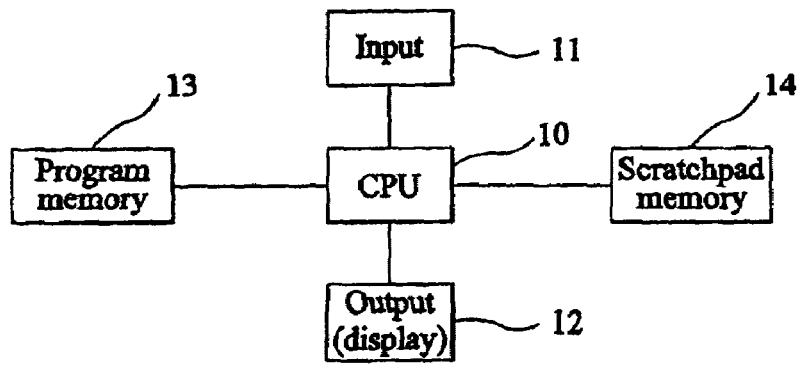
FIG. 4 is a block schematic diagram illustrating a computer for performing a method constituting an embodiment of the invention.

The computer shown in FIG. 4 comprises a central processing unit (CPU) 10 provided with an input arrangement 11 and an output arrangement 12, for example including a display for displaying the results of the processing performed by the CPU 10. The computer has a program memory 13 which contains a computer program for controlling the operation of the CPU 10 to perform a seismic data processing method as described hereinafter. The computer also has a scratchpad memory 14 for temporarily storing data during operation of the CPU 10, including a three dimensional (3D) memory which cooperates with graphics processing software in the program memory 13 to perform graphics processing including interpolation. The computer therefore functions as a graphics computer, such as a Sun or Silicon Graphics workstation or a high end PC having sufficient memory to store a large "cube" of data and a 3D graphics card with texture mapping which supports the OpenGL language from Silicon Graphics to perform the interpolation.

Figure 5:
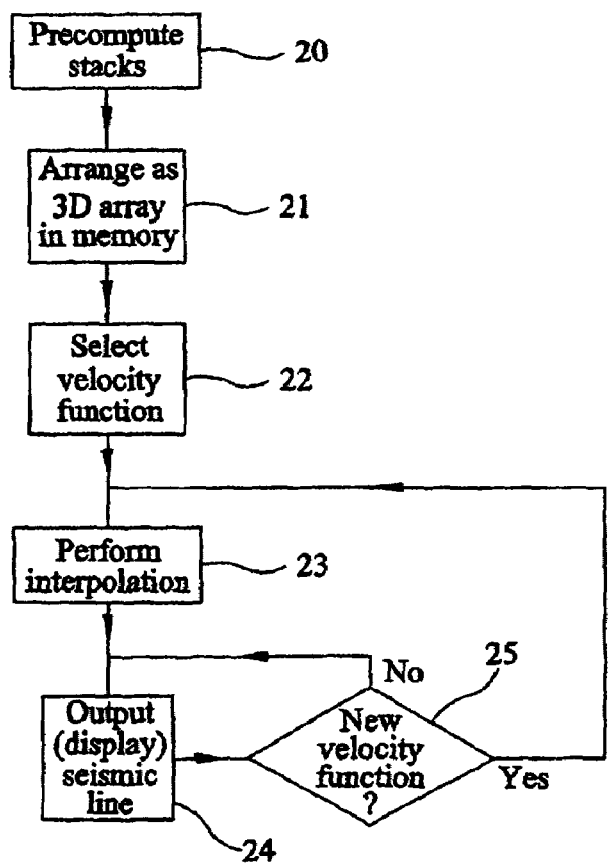
FIG. 5 is a flow diagram illustrating a method of processing seismic data constituting an embodiment of the invention.

The method performed by the computer shown in FIG. 4 is illustrated in FIG. 5 and begins with a step 20 which precomputes a plurality of seismic stacks from seismic data supplied to the computer for a plurality of known velocity fields or functions $V_1, \ldots, V_n$ In particular, the computer precalculates a stack for each common midpoint (CMP) and for each velocity field $V_i$. The known velocity functions are selected so as to span a range of velocities of interest. These known velocity functions may be selected in any suitable way and may be selected essentially arbitrarily or may be based on knowledge or experience associated with the seismic data being processed. For example, one of the velocity functions may be selected in accordance with any suitable criteria and the remaining known velocity functions may be equal to the product of the known velocity function and a set of coefficients. For example, the velocity functions may differ from each other by fixed percentages or fixed ratios to provide evenly spaced velocity functions spanning the range of velocities of interest.

Figure 6:
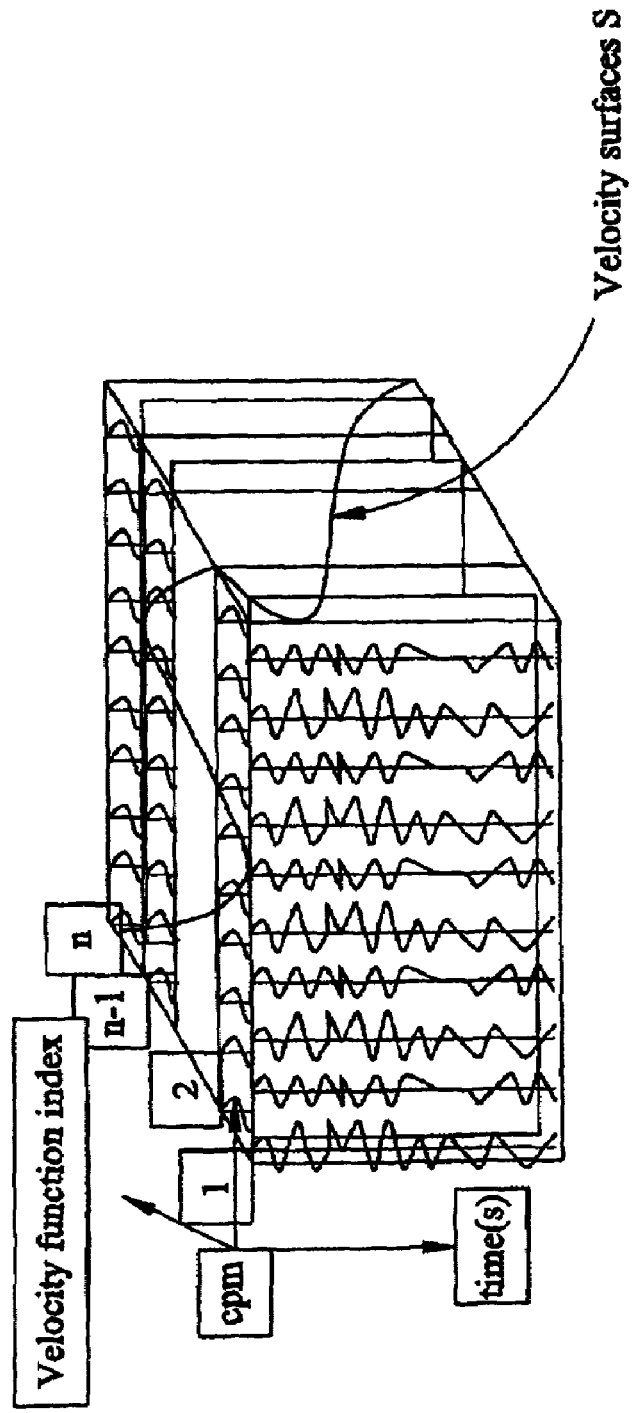
FIG. 6 illustrates a three dimensional array of data stored in the memory of the computer shown in FIG. 4.

The stacks formed in the step 20 are then arranged as a 3D array of stacks in the memory 14 in a step 21. For example, as shown in FIG. 6, the stacks are arranged in a rectangular 3D array as a cube of data with the vertical downward dimension representing increasing time, the right hand horizontal axis representing common midpoint number, and the depth axis into the plane of FIG. 6 representing the velocity function index with the velocity functions being indexed in increasing order of velocity.

In the 3D space containing the cube of stacked seismic data, any selected or chosen velocity function or field is represented by a velocity surface S as illustrated in FIG. 4 (provided that the values of the selected surface lie within the range of velocities spanned by the known velocity functions, for example between the extreme or end functions $V_1$ and $V_n$). As shown by the step 22 in FIG. 5, a velocity function is selected for further processing of the seismic data by a user and this determines the velocity surface S onto which the seismic data can be projected.

A step 23, for example performed within the graphics card, performs interpolation effectively so as to define a "stacked" line of seismic data based on interpolating onto the surface S from the individual samples of the stacks within the data cube which surround each point of the surface S. Although this processing does not yield a true stack, it provides a representation thereof and can be performed relatively quickly, for example in real time, using relatively modest hardware and software. A specific example of an interpolation technique will be described hereinafter.

A step 24 outputs the seismic line, for instance by displaying it on a display of the output arrangement 12 of the computer. A step 25 determines whether a new velocity function has been selected. Until a new function is selected, the output for the existing velocity function S remains available. A user may therefore examine the result of the processing in the form of the stacked line and may decide select a new function, for example by changing the velocity function or chosing a different function. When a new velocity function is selected, control returns to the step 23, which performs a fresh interpolation based on the new function.

Figure 7:
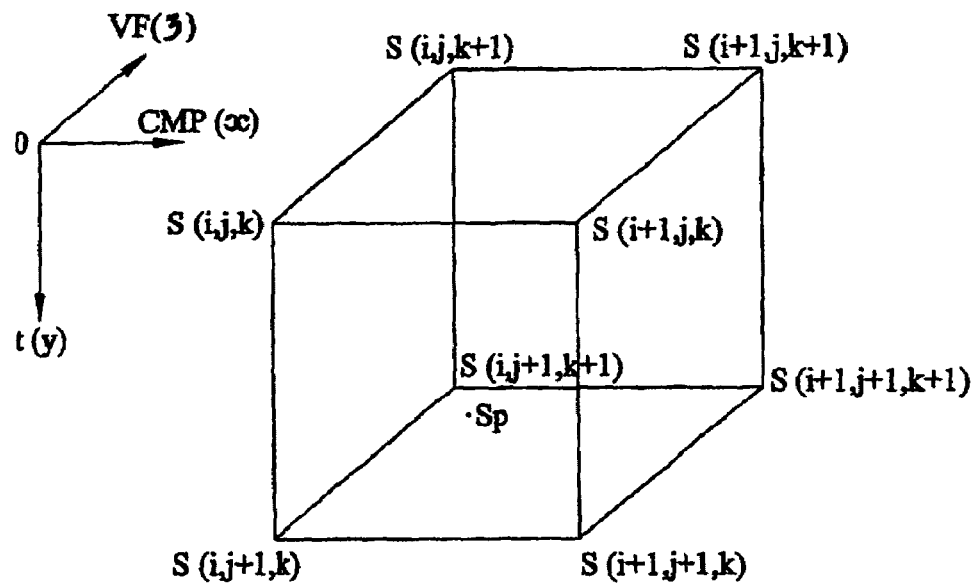
FIGS. 7 and 8 illustrate an example of interpolation performed by the method shown in FIG. 5.

Although the stacked traces shown in FIG. 6 are illustrated as continuous traces, they are in fact sampled and digitised so that each of the stacks comprises a plurality of digital codes representing the instantaneous sampled amplitude at discrete time points. The cube or space of 3D data is thus effectively divided into a plurality of cells, each of which is cuboidal and has at its vertices eight stack samples $S(i,j,k), \ldots, S(i+1, j+1,k+1)$ as illustrated in FIG. 7. The coordinate axis are shown again in FIG. 7 with the common midpoint (CMP) index increasing towards the right in the horizontal or x dimension, time increasing downwardly in the vertical or y dimension, and velocity function index increasing in the depth or z dimension into the plane of FIG. 7. The sample which occupies the top front left vertex of the cell is labelled as $S(i,j,k)$ and the remaining seven samples at the other verticies are labelled in accordance with the convention of the axes as described hereinbefore. A sample Sp is illustrated within the cell at a point on the velocity surface S at which it is desired to calculate the "output sample" for the selected velocity function. Thus, the cell illustrated in FIG. 7 is one of the cells intersected by the velocity surface S and the value of each sample Sp within a respective cell is calculated by the graphics card by interpolation.

Figure 8:
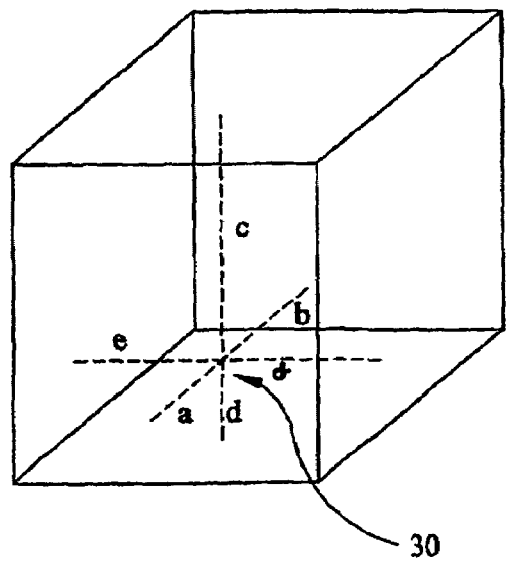

FIG. 8 illustrates the position 30 at which the sample Sp is to be calculated within the same cell as illustrated in FIG. 7. The point 30 may be anywhere within the cell, including the surfaces, edges and verticies thereof as well as internally within the volume of the cell. Without any loss of generality, the position of the point 30 can be represented by the distances a, . . . ,f from the various faces of the cuboidal cell. Thus, the point 30 is at a distance a from the front face and b from the rear face, a distance c from the top face and d from the bottom face, and a distance e from the left face and f from the right face, where any of the distances may be zero so that the position of the point 30 can be specified anywhere within the cell including on the external surface thereof.

The graphics card within the computer shown in FIG. 4 performs a linear interpolation in order to calculate the value or amplitude of the sample Sp from the samples S(i,j,k), . . . ,S(i+1, j+1, k+1) in accordance with a multi-linear (in this case trilinear) interpolation which may be represented as follows:

$$Sp = (a \cdot d \cdot s \cdot S(i, j, k+1) +$$
$$b \cdot d \cdot f \cdot S(i, j, k) + a \cdot c \cdot f \cdot S(i, j+1, k+1) +$$
$$b \cdot c \cdot f \cdot S(i, j+1, k) + a \cdot d \cdot e \cdot S(i+1, j, k+1) +$$
$$b \cdot d \cdot e \cdot S(i+1, j, k) + a \cdot c \cdot e \cdot S(i+1, j+1, k+1) +$$
$$b \cdot c \cdot e \cdot S(i+1, j+1, k))/((a+b)(c+d)(e+f))$$

The interpolation is performed for every cell of the cube of data intersected by the velocity surface S and thus provides a representation or approximation of a stacked line. This may be repeated for a plurality of lines to give a 3D representation of the subsurface structure of the earth represented by the seismic data.

Any suitable interpolation method may be performed within the step 23. For example, any suitable software, such as existing graphics card software, maybe used.

It is thus possible to provide a technique which allows a good representation of a stacked line to be derived relatively quickly and with relatively inexpensive hardware and software. This may be used, for example, in real time. Also, different velocity functions can be tried relatively quickly in order to allow a user to choose the best such function to fit the seismic data. When an optimum velocity function has been selected, it may be used for re-stacking of the seismic traces.

What is claimed is:

1. A method of processing seismic data, the method comprising the steps of:
   precomputing from the seismic data a plurality of seismic stacks at a plurality of positions and for a plurality of predetermined velocity functions which span a range of velocities of interest;
   arranging the stacks in a memory of a graphics computer as a three dimensional array with time, position and index of velocity function as the three dimensions of the array;
   defining a 3-D velocity surface within the range of velocities of interest, the velocity surface intersecting the range of the predetermined velocity functions; and
   using a graphics program of the computer to derive from the array of stacks a seismic line representing seismic data stacked for the defined velocity surface by interpolating from a set of values in the stacks surrounding each point of the selected velocity surface.

2. A method as claimed in claim 1, in which the positions comprise common midpoints of the seismic date.

3. A method as claimed in claim 1, in which at least some of the predeteimined velocity functions are selected arbitrarily.

4. A method as claimed in claim 3, in which the predetermined velocity functions comprise a first fuction and a plurality of second functions, each of which is equal to the product of the first function and a respective coefficient.

5. A method as claimed in claim 4, in which the coefficients are substantially evenly spaced.

6. A method as claimed in 1, in which the array is a rectangular array.

7. A method as claimed in claim 1, in which the interpolation is a linear interpolation.

8. A method as claimed in claim 7, in which the interpolation is a muitilinear interpolation.

9. A method as claimed in claim 8, in which the interpolation is a trilinear interpolation.

10. A computer programmed to perform a method of processing seismic data, comprising:
    precomputing from the seismic data a plurality of seismic stacks at a plurality of positions and for a plurality of predetermined velocity functions which span a range of velocities of interest;
    arranging the stacks in a memory of a graphics computer as a three dimensional array with time, position and index of velocity function as the three dimensions of the array;
    defining a 3-D velocity surface within the range of velocities of interest the velocity surface intersecting the range of the predetermined velocity functions; and
    using a graphics program of the computer to derive from the array of stacks a seismic line representing seismic data stacked for the defined velocity surface by interpolation from a set of values in the stacks surrounding each point of the selected velocity surface.

11. A program for programming a computer to perform a method of processing seismic data, comprising:
    precomputing from the seismic data plurality of seismic stacks at a plurality positions and for a plurality of predetermined velocity functions which span a range of velocities of interest;
    arranging the stacks in a memory of a graphics computer as a three dimensional array with time, position and index of velocity function as the three dimensions of the array; defining a 3-D velocity surface within the range of velocities of interest, the velocity surface intersecting the range of the predetermined velocity functions; and
    using a graphics program of the computer to derive from the array of stacks a seismic line representing seismic data stacked for the defined velocity surface by interpolation from a set of values in the stacks surrounding each point of the selected velocity surface.

12. An article comprising one or more machine-readable storage media containing instructions that when executed enable a computer to process seismic data by:
    precomputing from the seismic data a plurality of seismic stacks at a plurality of positions and for a plurality of predetermined velocity functions which span a range of velocities of interest;
    arranging the stacks in a memory of a graphics computer as a three dimensional array with time, position and index of velocity function as the three dimensions of the array;
    defining a 3-D velocity surface within the range of velocities of interest the velocity surface intersecting the range of the predetermined velocity functions; and using a graphics program of the computer to derive from the array of stacks a seismic line representing seismic data stacked for the defined surface by interpolation from a set of values in the stacks surrounding each point of the selected velocity surface.

13. A computer programmed to perform the method of processing seismic data as claimed in claim 10, in which the positions comprise common midpoints of the seismic data.

14. A computer programmed to perform the method of processing seismic data as claimed in claim 10, in which the predetermined velocity functions comprise a first function and a plurality of second functions, each of which is equal to the product of the first function and a respective coefficient.

15. A computer programmed to perform the method of processing seismic data as claimed in claim 10, in which the array is a rectangular array.

16. A computer programmed to perform the method of processing seismic data as claimed in claim 10, in which the interpolation is a linear interpolation.

17. A program for programming a computer to perform the method of processing seismic data as claimed in claim 11, in which the positions comprise common midpoints of the seismic data.

18. A program for programming a computer to perform the method of processing seismic data as claimed in claim 11, in which the predetermined velocity function comprise a first function and a plurality of second functions, each of which is equal to the product of the first function and a respective coefficient.

19. A program for programming a computer to perform the method of processing seismic data as claimed in claim 11, in which the array is a rectangular array.

20. A program for programming a computer to perform the method of processing seismic data as claimed in claim 11, in which the interpolation is a linear interpolation.

21. An article comprising one or more machine-readable storage media containing instructions that when executed enable a computer to process seismic data by the method as claimed in claim 12, in which the positions comprise common midpoints of the seismic data.

22. An article comprising one or more machine-readable storage media containing instructions that when executed enable a computer to process seismic data by the method as claimed in claim 12, in which the predetermined velocity functions comprise a first function and a plurality of second functions, each of which is equal to the product of the first function and a respective coefficient.

23. An article comprising one or more machine-readable storage media containing instructions that when executed enable a computer to process seismic data by the method as claimed in claim 12, in which the array is a rectangular array.

24. An article comprising one or more machine-readable storage media containing instructions that when executed enable a computer to process seismic data by the method as claimed in claim 12, in which the interpolation is a linear interpolation.

* * * * *